United States Patent [19]

Sasada

[11] Patent Number: 5,235,438
[45] Date of Patent: Aug. 10, 1993

[54] IMAGE SCANNING AND RECORDING METHOD AND APPARATUS FOR COMPENSATING FOR A PYRAMIDAL ERROR OF A ROTATING POLYGON

[75] Inventor: Shigeru Sasada, Kyoto, Japan

[73] Assignee: Dainippon Screen Mfg. Co. Ltd., Japan

[21] Appl. No.: 738,346

[22] Filed: Aug. 14, 1991

[30] Foreign Application Priority Data

Aug. 21, 1990 [JP] Japan .................. 2-220310

[51] Int. Cl.$^5$ .............................................. H04N 1/04
[52] U.S. Cl. ..................... 358/481; 358/474; 358/296; 346/108; 250/235
[58] Field of Search ............... 358/481, 474, 480, 412, 358/296; 346/108, 160; 250/235

[56] References Cited

U.S. PATENT DOCUMENTS

| | | | |
|---|---|---|---|
| 4,195,316 | 3/1980 | Sansome | 358/481 |
| 4,270,131 | 5/1981 | Tompkins et al. | 358/481 |
| 4,284,994 | 8/1981 | Radl | 358/481 |
| 4,310,757 | 1/1982 | Check, Jr. et al. | 358/481 |
| 4,404,596 | 9/1983 | Juergensen et al. | 358/481 |
| 4,600,837 | 7/1986 | DiStefano et al. | 358/481 |
| 5,023,448 | 6/1991 | Kessler et al. | 358/481 |
| 5,043,744 | 8/1991 | Fantuzzo et al. | 358/474 |
| 5,046,796 | 9/1991 | Andoh et al. | 358/481 |
| 5,049,897 | 9/1991 | Ng | 346/108 |

*Primary Examiner*—Edward L. Coles, Sr.
*Assistant Examiner*—Fan Lee
*Attorney, Agent, or Firm*—Brumbaugh, Graves, Donohue & Raymond

[57] ABSTRACT

An image scanning and recording method and apparatus for compensating for a pyramidal error of a rotating body having at least two reflective mirror surfaces by fine-adjusting an angle of a light beam incident on the rotating body. A scanning lens having a scanning characteristic of f·sin$\theta$ is provided on an optical path of the light beam reflected on the rotating body in such a manner that an optical axis of the scanning lens is substantially orthogonal to a rotating axis of the rotating body. The angle of the light beam incident on the rotating body is deflected by a deflecting device within a plane including the rotating axis and the optical axis for each reflective mirror surface based on an equation:

$$\sin\alpha = \cos a \cdot \sin 2\delta \cdot \cos(i+\Delta) - \cos 2\delta \cdot \sin(i+\Delta)$$

wherein
- $\alpha$: an angle made of the light beam reflected on the rotating body and a plane including the optical axis and being orthogonal to the rotating axis,
- $\delta$: a pyramidal error of each reflective mirror surface of the rotating body,
- $i+\Delta$: an angle made of the light beam incident on the rotating body and the optical axis,
- $\Delta$: an angle of the light beam deflected by the deflecting device, and
- $a$: an angle made of a normal line of each reflective mirror surface and the optical axis when there is no pyramidal error.

11 Claims, 7 Drawing Sheets

X: Main scanning direction
Y: Sub scanning direction

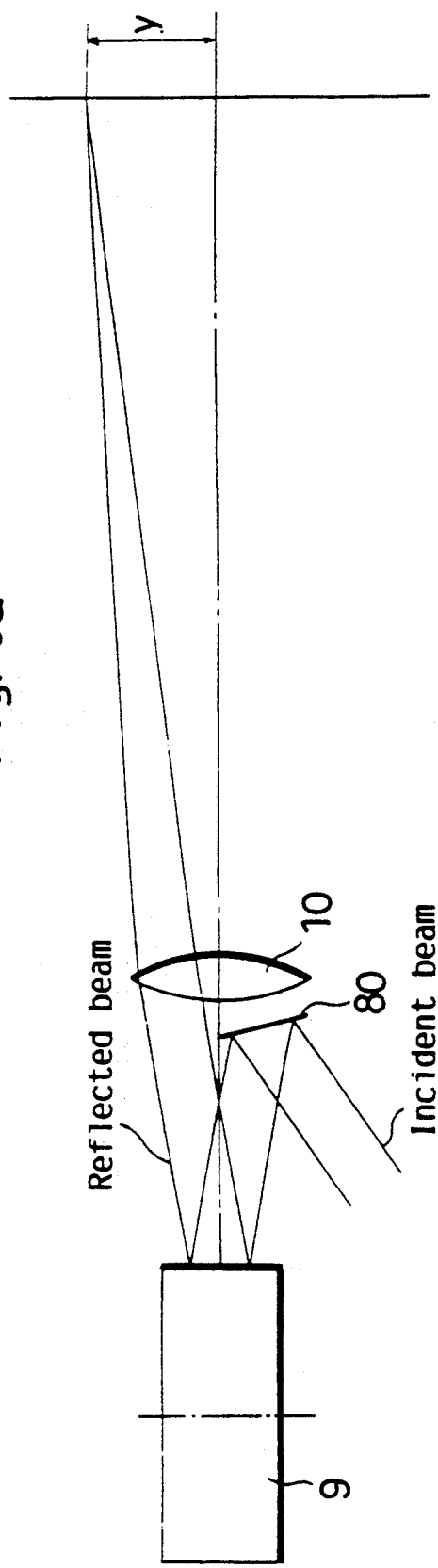
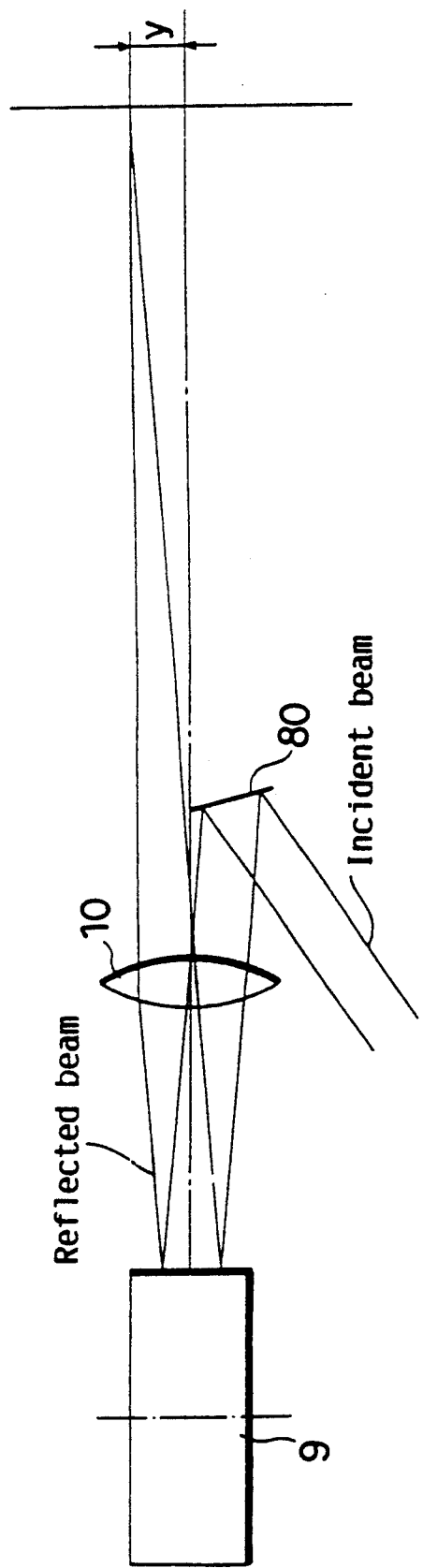

IMAGE SCANNING AND RECORDING METHOD AND APPARATUS FOR COMPENSATING FOR A PYRAMIDAL ERROR OF A ROTATING POLYGON

BACKGROUND OF THE INVENTION

(1) Field of the Invention

The present invention relates to an image scanning technology for recording or reading an image on a surface by scanning the surface with a light beam by use of a deflecting device such as a polygon mirror and a scanning lens, especially to an image scanning method and apparatus for compensating for a pyramidal error of the polygon mirror by fine-adjusting an angle of the light beam incident on the polygon mirror.

(2) Description of the Prior Art

In a flatbed scanning prepressing scanner, a light beam for image reading or recording is required to be deflected along a main scanning direction thereof periodically. Generally used as a deflecting device is a polygon mirror.

A locus of the light beam deflected by the polygon mirror on a plane (namely, a line made of dots formed on the plane in the main scanning direction; will be referred to as a trace line) is not necessarily a completely straight line, but tends to be deviated in a sub scanning direction or curved due to a pyramidal error of the polygon mirror.

The above phenomena, especially if they are excessive, deteriorate image quality or reading precision. In order to prevent such malfunction, the pyramidal error is compensated for.

Due to the problems inherent in manufacturing a polygon mirror, it is not avoidable that the parallelism of each mirror surface of the polygon mirror is nonuniform with respect to a rotating axis of the polygon mirror. The pyramidal error caused by the nonuniformity is, for example, ±10".

Japanese Patent Publication Kokai No. 58-100117 has disclosed an image scanning apparatus for compensating for the pyramidal error. A laser beam is incident on a polygon mirror from a main scanning plane. (The main scanning plane is a deflecting plane perpendicular to a rotating axis of the polygon mirror and includes an optical axis of an f·θ lens for focusing the light beam reflected on each mirror surface of the polygon mirror and leading the focused light to a photoconductive body.) The angle of incident of the laser beam is fine-adjusted by an AOD (acoustic optical deflector) or the like in accordance with a pyramidal error of each mirror surface and a rotating angle of the rotating axis. More practically, the laser beam from a main scanning plane is deflected by an angle corresponding to a pyramidal error of the polygon mirror in such the direction that counterattacks the deviation or the curve of the trace line. As a result, the light beam reflected on the polygon mirror is surely reflected on the main scanning plane, whereby the trace line is prevented from being deviated or curved.

In the above apparatus, when the polygon mirror having a pyramidal error is rotated, the angle made of the incident light beam and the polygon mirror is constantly changed due to the scanning characteristic of the f·θ lens employed as the scanning lens. The trace line is asymmetrically curved as shown with a dashed line in FIG. 1 with respect to the ideal sub scanning line indicated by the 4 axis. This means a deviation amount of the trace line with respect to the ideal sub scanning line is different depending on at which position of the mirror surface the light beam is reflected.

Such a problem is solved by detecting the rotating angle of the rotating axis of the polygon mirror as well as the pyramidal error, and fine-adjusting the angle of incidence of the laser beam continuously for each mirror surface in accordance with the rotating angle and the pyramidal error. Since this requires quite fast and precise control, the control system gets complicated, huge and expensive.

Japanese Patent Publication Kokai No. 60-186821 has also disclosed an image scanning apparatus for compensating for the pyramidal error. A laser beam is incident on a polygon mirror from right below of an optical axis of an f·θ lens which is provided outside a main scanning plane and on an outgoing side of the polygon mirror. The angle of incidence of the laser beam is fine-adjusted by an AOD or the like in accordance with the pyramidal error of each mirror surface as in the conventional apparatus mentioned above. In this way, the trace line is prevented from being deviated or curved.

The above construction does restrict the deviation or the curve of the trace line. However, the incident laser beam has an angle with respect to the optical axis of the f·θ lens since the main scanning plane is off the optical axis. Therefore, the trace line runs farther and farther from the ideal sub scanning line to be a linebow as shown with a solid line in FIG. 1. Such a phenomenon deteriorates image quality and reading precision. The apparatus disclosed in this publication is equipped with an optical compensating device such as a concaved mirror. If the angle made of the incident light beam and the optical axis of the f·θ lens is large (for example, 5° to 15°), the curve of the trace line is too large for practical use. Such a large curve is only compensated by a concaved mirror having a width at least equal to the scanning width of the laser beam, which makes the optical system complicated and huge and expensive.

SUMMARY OF THE INVENTION

Accordingly, this invention has an object of offering an image scanning method for compensating for a pyramidal error of a polygon mirror in a simple manner.

The above object is fulfilled by an image scanning method for compensating for a pyramidal error of a rotating body having at least two reflective mirror surfaces by fine-adjusting an angle of a light beam incident on the rotating body. A scanning lens having a scanning characteristic of f·sinθ is put on an optical path of the light beam reflected on the rotating body in such a manner that an optical axis of the scanning lens is substantially orthogonal to a rotating axis of the rotating body. The angle of the light beam incident on the rotating body is deflected by a deflecting device within a plane including the rotating axis of the rotating body and the optical axis of the scanning lens for each reflective mirror surface based on an equation:

$$\sin\alpha = \cos a \cdot \sin 2\delta \cdot \cos(i+\Delta) - \cos 2\delta \cdot \sin(i+\Delta)$$

where:

an angle made of the light beam reflected on the rotating body and a plane including the optical axis of the scanning lens and being orthogonal to the rotating axis of the rotating body, a: a pyramidal error of each reflective mirror surface of the rotating body, i+Δ: an angle made of the light beam incident on the rotating body and the optical axis of the scanning lens, Δ: an angle of the light beam deflected by the deflecting device, and a: an angle made of a normal line of each reflective mirror surface and the optical axis of the scanning lens when there is no pyramidal error.

The rotating body may be a polygon mirror and the deflecting device may be an acoustic optical deflector.

Another object of this invention is to offer an image scanning apparatus for carrying out such a method with a simple construction.

The above object is fulfilled by an image scanning apparatus comprising a scanning lens having a scanning characteristic of f·sinθ provided in such a manner that an optical axis of the scanning lens is substantially orthogonal to a rotating axis of the rotating body; a deflecting device for deflecting the angle of the light beam incident on the rotating body within a plane including the rotating axis of the rotating body and the optical axis of the scanning lens; a pyramidal error compensating amount outputting device for outputting a pyramidal error compensating amount of each reflective mirror surface of the rotating body based on a pyramidal error amount thereof which has been measured in advance; and a control device for fine-adjusting the angle of the light beam incident on one of the reflective mirror surfaces by moving the deflecting device with respect to the above one reflective mirror surface based on the pyramidal error compensating amount of the above one reflective mirror surface.

The above image scanning apparatus may further comprise a first detecting device for detecting an origin of the rotating axis of the polygon mirror and a second detecting device for detecting a start of a main scanning for each reflective mirror surface. The pyramidal error compensating amount outputting device defines one of the reflective mirror surfaces which is used for scanning based on the detecting results of the first and the second detecting device and outputs a pyramidal error compensating amount of the above one reflective mirror surface.

The pyramidal error compensating amount outputting device may be a memory for storing data concerning the pyramidal error compensating amount corresponding to the above one reflective mirror surface.

According to the above method and construction, an f·sinθ lens is used as a scanning lens for focusing the light beam reflected on the mirror surface of the rotating body. The light beam which has passed through such a lens is deviated from an optical axis thereof in the sub scanning direction by a constant amount regardless of the rotation of the rotating body owing to the scanning characteristic of the lens even if the incident light beam is slanted from the optical axis. As a result, the curve of the trace line is negligibly small.

When the light beam is incident on the rotating body from a position which is substantially or right below the optical axis of the lens and is also within a plane including the rotating axis of the rotating body and the optical axis of the lens, the curve of the trace line is symmetrical. Consequently, the pyramidal error compensation requires no continuous fine-adjustment of the angle of incidence of the light beam on the polygon mirror. The compensation can be done by adjusting the angle of incidence only once for each mirror surface with a simple construction.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 3a and 3b are views of a polygon mirror and an f·sinθ lens cut along a plane including a rotating axis of the polygon mirror and an optical axis of the lens;

DESCRIPTION OF A PREFERRED EMBODIMENT

Overall Construction and Operation

Figure 1:
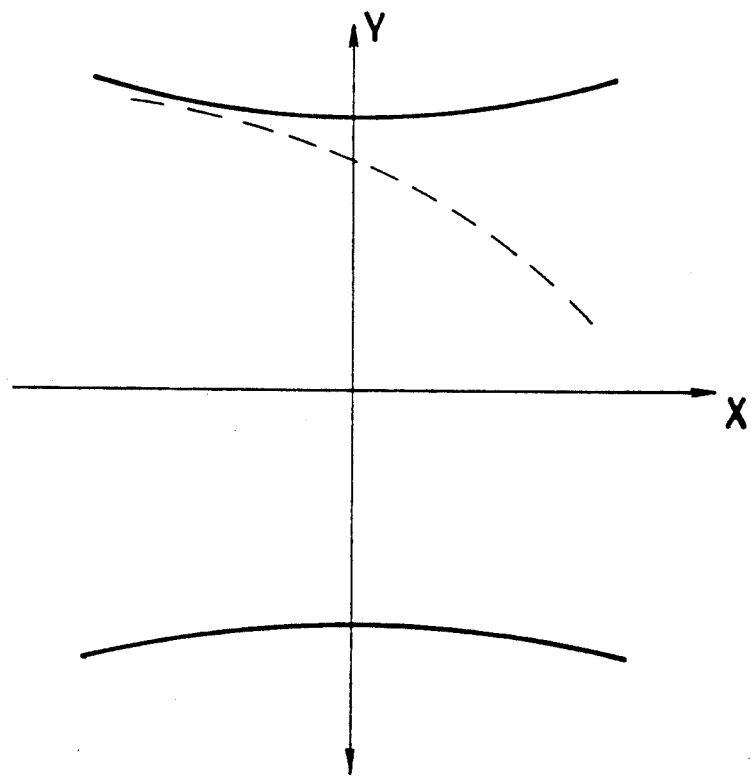
FIG. 1 shows trace lines made in conventional image scanning apparatuses.
Figure 2:
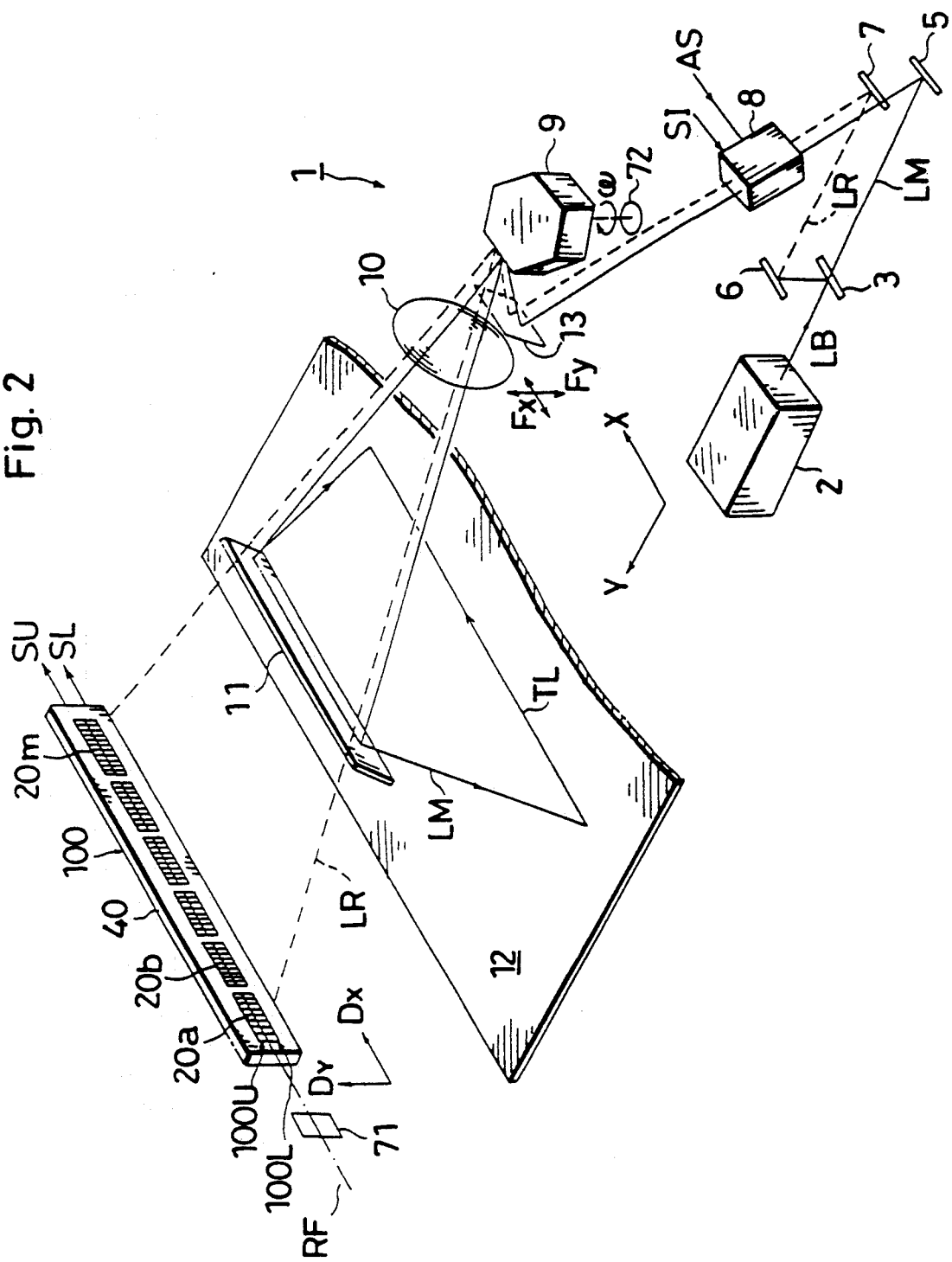
FIG. 2 is a perspective view showing an overall construction of an image scanning apparatus as an embodiment of this invention.

FIG. 2 is a perspective view showing an overall construction of an image scanning apparatus 1 as an embodiment of this invention.

The image scanning apparatus 1 is a flatbed-scanning type prepressing scanner equipped with a rotatable polygon mirror. X and Y indicate main and sub scanning directions, respectively.

A laser beam LB generated by a laser beam source 2 is divided into a main beam LM and a reference beam LR by a half mirror 3.

The main beam LM is reflected on a mirror 5 and is incident on an AOD 8 acting as a deflecting device. The AOD 8 receives an image signal SI for ON/OFF-modulating the main beam LM from a signal generating device (not shown), whereby an image is recorded on a photoconductive body 12 as will be described later.

The reference beam LR is reflected on mirrors 6 and 7 and is incident on the AOD 8 in parallel with the main beam LM. The AOD 8 receives an angle adjusting signal AS for fine-adjusting an angle of incidence of the beams LM and LR on a mirror surface of the polygon mirror 9. The signal AS is sent from a control device (FIG. 7) based on a pyramidal error of the polygon mirror 9. In accordance with the signal AS, the AOD 8 deflects the main beam LM and the reference beam LR in $F_y$ directions, which are optically equivalent with the sub scanning direction Y. The deflecting angles for the main beam LM and the reference beam LR are substantially equal to each other.

Then, the main beam LM and the reference beam LR are incident on the polygon mirror 9 through a mirror 13, the polygon mirror 9 rotating at a certain speed in an direction. As a result, the main beam LM and the reference beam LR are deflected periodically in $F_x$ directions in accordance with the rotation of the polygon mirror 9. The $F_x$ directions are optically equivalent with the main scanning direction X.

The main beam LM goes through an f·sinθ lens 10, and is reflected on a mirror 11 toward the photoconductive body 12. In accompaniment with the rotation of the polygon mirror 9, the main beam LM scans the photoconductive body 12 in the main scanning direction X and selectively exposes portions of a surface of the body 12. A scanning locus of the main beam LM, namely, a trace line TL defines a scanning line in image recording.

The photoconductive body 12 is moved in the sub scanning direction Y with respect to the main beam LM by a transporting device (not shown), whereby a two-dimensional latent image is recorded on the photoconductive body 12 in accordance with the signal SI.

The AOD 8 is optically provided right below an optical axis of the f·sinθ lens 10, so that the beams LM and LR are incident on each mirror surface of the polygon mirror 9 from a plane including the optical axis and a rotating axis of the polygon mirror, which is orthogonal to the optical axis.

The mirror 13 may be eliminated, in which case, the beams LM and LR are directly incident on the polygon mirror 9 from the AOD 8.

The AOD 8 may be replaced with a fine-adjusting mirror 80. The mirror 80 may be provided between the polygon mirror 9 and the f·sinθ lens 10 as in FIG. 3a or outside the f·sinθ lens 10 as in FIG. 3b.

The reference beam LR, after being deflected, goes through the f·sinθ lens 10 and is incident on a photosensor array 100 acting as a grating sensor. The photosensor array 100 comprises a longitudinal insulating substrate 40 and a plurality of photosensors 20a, 20b, ... and 20m linearly fixed on the substrate 40. A longitudinal direction $D_x$ and a transverse direction $D_y$ of the array 100 are optically equivalent with the main and the sub scanning directions X and Y, respectively. In other words, the photosensor array 100 is equivalently located with respect to the main beam LM on the photoconductive body 12, namely, the trace line TL.

Each photosensor comprises an upper portion and a lower portion which are provided in parallel. The upper portions of the photosensors are all electrically connected to form an upper sensor array 100U, and the lower portions of the photosensors are all electrically connected to form a lower sensor array 100L.

The reference beam LR, which are received by the photosensor array 100, is photoelectric-transferred by the upper and lower sensor arrays 100U and 100L to be sent to the control device 70 as a pair of signals SU and SL.

The signals SU and SL indicate how much the reference beam LR is deflected in the sub scanning direction Y on the photosensor array 100 from a reference line RF, which is a border between the upper sensor array 100U and the lower sensor array 100L. Even if the pyramidal error is theoretically compensated, the trace line TL sometimes has a slow curve by the swing of the rotating axis of the polygon mirror 9. The signals SU and SL are used to correct the trace line TL in such a case. The photosensor array 100 may be replaced by another device.

A start sensor 71 for detecting the reference beam LR is provided in a scanning area of the reference beam LR. An origin pulse generator 72 is connected to the rotating axis of the polygon mirror 9.

When the reference beam LR goes through the start sensor 71 and the start sensor 71 sends a detecting signal to the control device 70, the control device 70 starts counting the time and thus judges the position of the reference beam LR. Based on an origin pulse from the generator 72, the control device 70 judges a rotating angle of the rotating axis of the polygon mirror 9. By use of both the judging results, which mirror surface of the polygon mirror 9 is used for scanning is judged.

Principle of Pyramidal Error Compensation

The principle of pyramidal error compensation according to the present invention will be described referring to FIGS. 4 and 5. (The beam means the main beam LM, hereinafter.)

Figure 4:
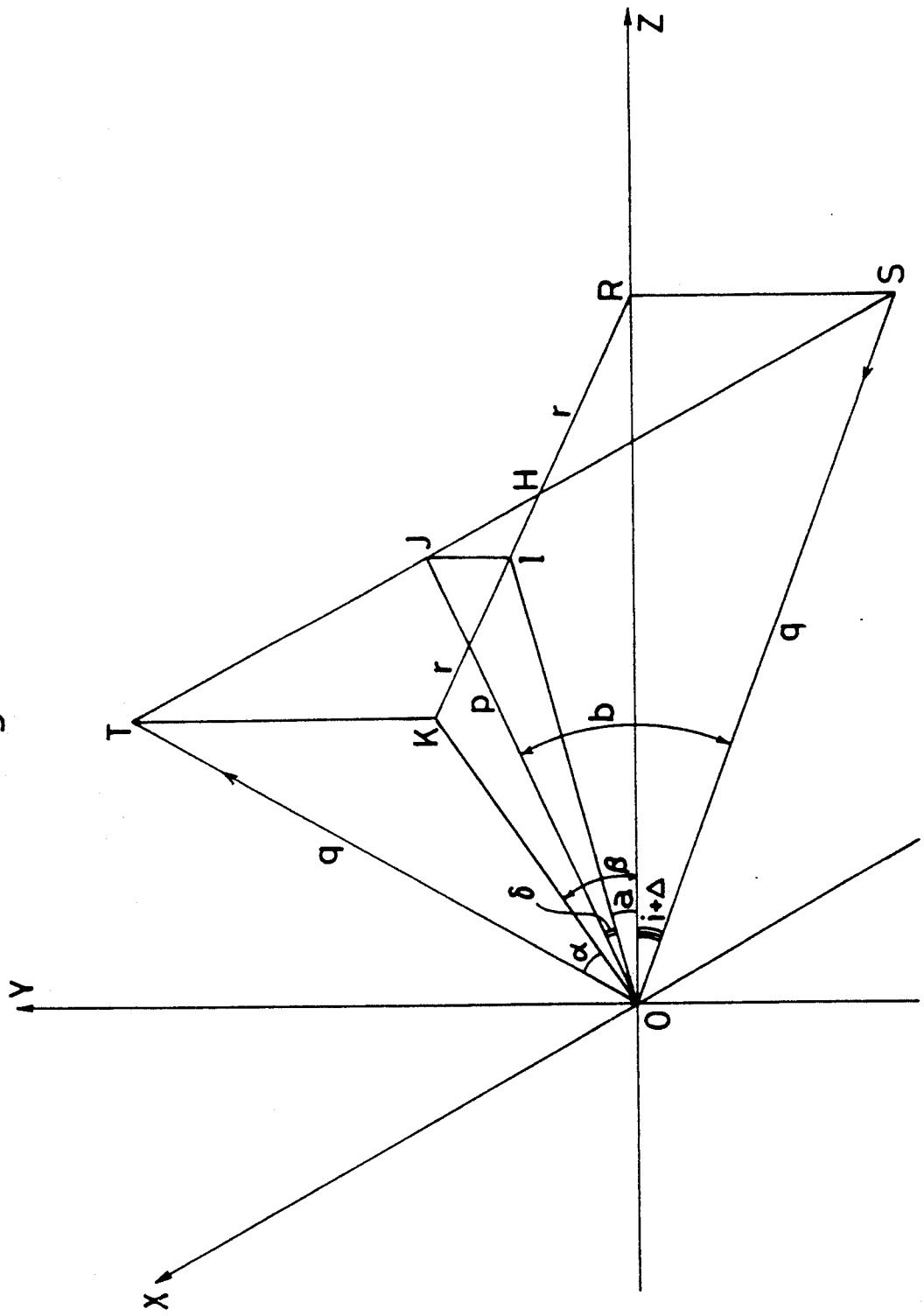
FIG. 4 is a perspective view explaining the definitions of the symbols in this specification.

FIG. 4 shows what each symbol defines in this specification. FIG. 5 is a schematic view showing how the reflected beam reaches the photoconductive body 12 through the f·sinθ lens 10. In addition, FIG. 4 is an enlarged view of an origin 0 and a vicinity thereof of FIG. 5.

In the pyramidal error compensation in this embodiment, the f·sinθ lens 10 is used, instead of an f·θ lens which is conventionally used, as a scanning lens for leading the beam reflected on the polygon mirror 9 toward the photoconductive body 12. Moreover, the laser beam from the laser beam source 2 is incident on each mirror surface of the polygon mirror 9 from a position right below the optical axis, the position belonging to a plane which includes the optical axis of the lens 10 and the rotating axis of the polygon mirror 9 orthogonal to the optical axis, whereby the angle of incidence of the beam is fine-adjusted. In this way, the pyramidal error compensation is carried out with a simple construction.

Referring to FIG. 4, the definition of each symbol will be explained. It should be noted that the mirror surface and the rotating axis of the polygon mirror 9 are both at the origin O for a simpler explanation in FIG. 4.

The geometric optical system in FIG. 4 constitutes an O-XYZ three-dimensional rectangular coordinate system, wherein X is the main scanning direction, Y is the sub scanning direction (corresponds with the rotating axis of the polygon mirror 9), and Z is the optical axis of the f·sinθ lens 10. Y is the optically equivalent sub scanning direction to the sub scanning direction in FIG. 2.

A line segment SO defines the beam incident on the mirror surface of the polygon mirror 9 from the laser beam source 2 through the AOD 8 or the fine-adjusting mirror 80. A line segment OT defines the beam reflected from the mirror surface of the polygon mirror 9 and led to the photoconductive body 12. A line segment OJ defines a normal line on the mirror surface of the polygon mirror 9. K and I are positions on an XZ plane (main scanning plane) of perpendiculars from T and J, respectively. R is a position on the XZ plane of a perpendicular from S.

Since SO=OT=q, ∠TJO=∠SJO=90°. ∠SOR=i+Δ is an angle made of the incident beam SO and the optical axis of the lens 10. Δ indicates an angle by which the incident beam is fine-adjusted by the AOD 8 or the fine-adjusting mirror 80 based on the angle adjusting signal AS.

∠ROI=a is a rotating angle of the rotating axis of the polygon mirror 9. ∠JOI=δ, namely an angle made of the XZ plane and the normal line OJ is a pyramidal error of the mirror surface of the polygon mirror. ∠TOK=α is an angle made of the reflected beam OT and the XZ plane. ∠ROK=β is an angle made of a projected image OK of the reflected beam OT on the XZ plane and the optical axis of the lens 10. ∠JOS=∠JOT=b.

Figure 5:
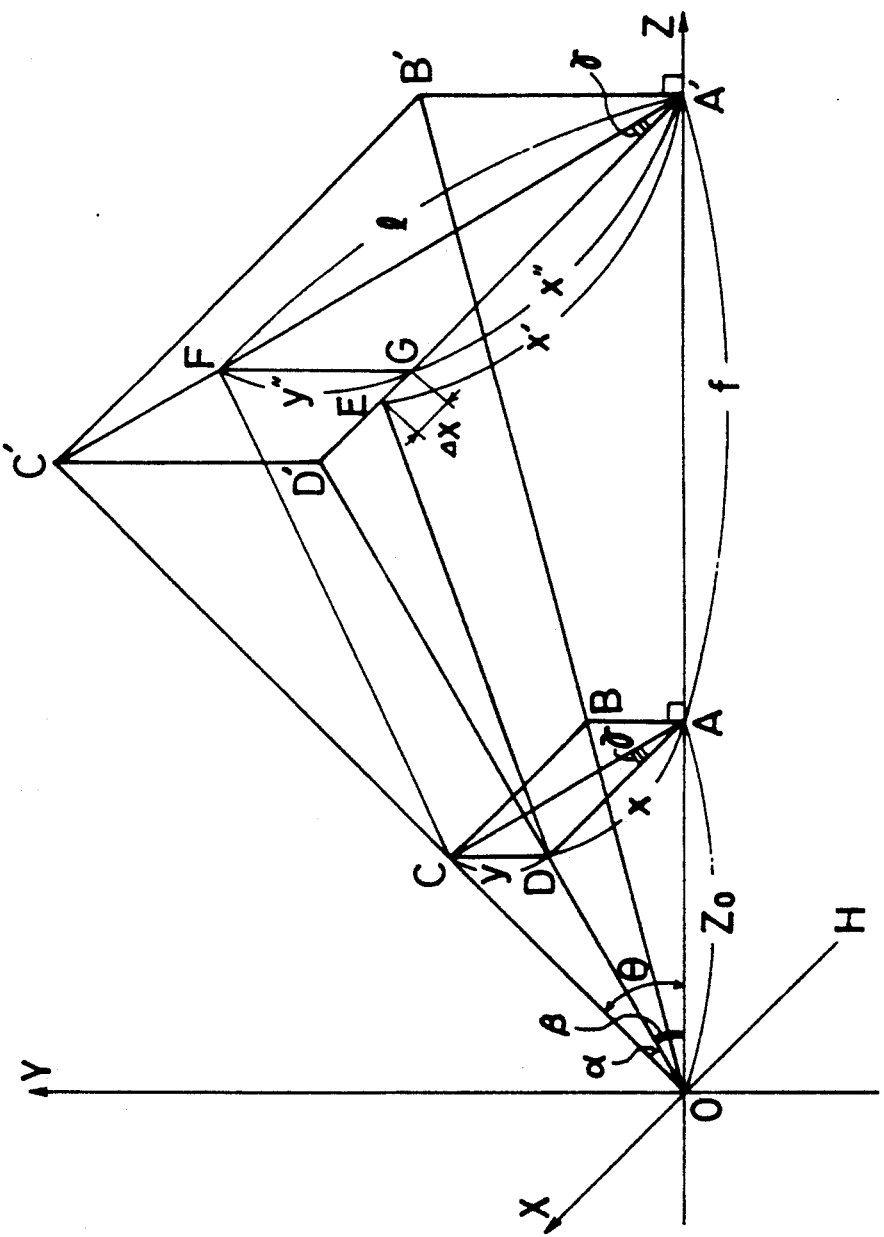
FIG. 5 is a perspective view showing a reflected light beam reaching a photoconductive body through the f·sinθ lens.

Referring to FIG. 5, a deviation amount $y'' - y_0''$ caused by the pyramidal error will be explained.

□ABCD, which is a part of the f·sin$\theta$ lens 10, is orthogonal to the optical axis (CZ) thereof. □A'B'C'D' is a surface of the photoconductive body 12 which is similar to and parallel with □ABCD. A polygonal line ODE indicates the beam for scanning the XZ plane. A polygonal line OCF indicates the beam for scanning a plane which is slanted from the XZ plane by an angle $\gamma$. A point D' is on the XZ plane.

Although not shown in FIG. 5, a length l of a line segment A'F at $\beta = 0$ is $y_0''$. It should be noted that the line segment A'F means the line segment GF because G coincides with A' when $\beta = 0$.

In $\triangle$A'B'C'D', a length of a line segment EA' is x', a length of a line segment GA' is x'', and $x' - x'' = \Delta x$. $y'' - y_0 = \Delta y$. In {ABCD, DA=x, DC=y, $\angle$CAD=$\gamma$, and OA=Z$_0$. Because ABCD//A'B'C'D', $\angle$CAD=$\phi$-C'A'D'=$\gamma$. $\angle$DAO=$\angle$D'A'O=90°. $\angle$AOC-=$\angle$A'OC'=$\theta$ (an angle made of the optical axis and the reflected beam). From the above, $$\tan\alpha = \frac{y}{z_0} \cos\beta \tag{1}$$

$$\tan\beta = \frac{x}{z_0} \tag{2}$$

$$\tan\theta = \frac{\sqrt{x^2 + y^2}}{z_0} \tag{3}$$

$$\tan\gamma = \frac{y}{|x|} \tag{4}$$

How to obtain Equation (1) will be explained below. From the geometric relationship in FIG. 5, $$\tan\alpha = (DC/DO) = (y/DO) \tag{1}'$$

Since $\angle$DAO=90°, $$DO = AO/\cos\beta = Z_0/\cos\beta \tag{1}''$$

Obtained by substituting Equation (1)'' into Equation (1)' is Equation (1).

Equations (2) through (4) are obtained in the same way.

Since ABCD//A'B'C'D', the simultaneous equations (1) through (4) are solved by erasing $\gamma$, x, y, $\theta$ and z$_0$. Obtained by setting x'' and y'' as in FIG. 5 are:

$$x'' = l \cdot \cos\gamma \tag{5}$$

$$y'' = l \cdot \sin\gamma \tag{6}$$

Based on Equations (1) through (6), x'', y'', $\Delta x$ and $\Delta$ are obtained when an f·tan$\theta$ lens, an f·$\theta$ lens or an f·sin$\theta$ lens is used. f is a focul distance of each lens. For each lens, $l = f \cdot \tan\theta$, $l = f \cdot \theta$, and $l = f \cdot \sin\theta$.

(I) $f \cdot \tan\theta$ lens $$\begin{aligned} x'' &= f \cdot \tan\beta \\ y'' &= f \frac{\tan\alpha}{\cos\beta} \end{aligned} \tag{7}$$

$$\begin{aligned} \Delta x &= 0 \\ \Delta y &= f \cdot \tan\alpha \left( \frac{1}{\cos\beta} - 1 \right) \end{aligned} \tag{8}$$

(II) $f \cdot \theta$ lens $$\begin{aligned} x'' &= f \cdot \tan^{-1} \sqrt{\frac{\tan^2\alpha}{\cos^2\beta} + \tan^2\beta} \cdot \cos\left(\tan^{-1} \frac{\tan\alpha}{\sin\beta}\right) \\ y'' &= f \cdot \tan^{-1} \sqrt{\frac{\tan^2\alpha}{\cos^2\beta} + \tan^2\beta} \cdot \cos\left(\tan^{-1} \frac{\tan\alpha}{\sin\beta}\right) \end{aligned} \tag{9}$$

$$\begin{aligned} \Delta x &= f\beta - x'' \\ \Delta y &= y'' - f \cdot \alpha \end{aligned} \tag{10}$$

(III) $f \cdot \sin\theta$ lens $$\begin{aligned} x'' &= f \cdot \cos\alpha \cdot \sin\beta \\ y'' &= f \cdot \sin\alpha \end{aligned} \tag{11}$$

$$\begin{aligned} \Delta x &= f \cdot \sin\beta (1 - \cos\alpha) \\ \Delta y &= 0 \end{aligned} \tag{12}$$

Equation (12) has a premise that the angle $\alpha$ is constant. Although the angle $\alpha$ is not constant in this embodiment, $\Delta y$ can be extremely small as will be described later.

It is apparent by comparing Equations (7) through (12) that the deviation amount y'' does not includes $\beta$ when the f·sin$\theta$ is used. In other words, the f·sin$\theta$ lens is not influenced by $\beta$, which is varied in accordance with the rotating angle a (FIG. 4) of the rotating axis of the polygon mirror 9. Accordingly, the deviation amount y'' is maintained at a certain value, whereby generating no linebow as long as the angle $\alpha$ is kept constant. The angle $\alpha$ is kept constant by fine-adjusting the value of $\Delta$ of $\angle$SOR = i + $\Delta$ by use of the AOD 8 or the mirror 80 in consideration of the pyramidal error of the mirror surface of the polygon mirror 9.

According to this invention, the generation of the linebow is prevented by adjusting the value of i + $\Delta$ (or more practically the value of $\Delta$) so that the value of $\alpha$ is kept constant based on the relationship between $\alpha$ and i + $\Delta$.

Referring to FIG. 4, how to obtain the relationship between the angle $\alpha$ and i + $\Delta$ will be described.

Since line segments TK and SR are both perpendicular to the XZ plane, TK//SR. Line segments TS and KR are on a plane formed by TK and SR. The line segment RK also belongs to the XZ plane. Accordingly, the intersecting point H of TS and KR is on the XZ plane.

$\triangle$TSO is an isosceles triangle because OT=OS≡q and TJ=SJ because OJ is a perpendicular bisector of TS. Since TK//JI//SR, KI=RI≡r. Where OJ≡p, Equations (13) through (17) are obtained.

Since TK//JI//RS and TJ=JS, TK−JI=JI+SR geometrically. Accordingly, $$q \cdot \sin\alpha - p \cdot \sin\delta = p \cdot \sin\delta - q \cdot \sin(i + \Delta) \tag{13}$$

Owing to the theorem of cosine at $\triangle$RIO, namely, $$r^2 = OR^2 + OI^2 - 2OR \cdot OI\cos a,$$
$$r^2 = q^2 \cdot \cos^2(i + \Delta) + p^2 \cdot \cos^2\delta - \quad (14)$$
$$2p \cdot q \cdot \cos(i + \Delta) \cdot \cos\delta \cdot \cos a$$

Since $\angle JIO = \angle SJO = 90°$, (JI+RS), RI and SJ form a right-angled triangle. Accordingly, $$r^2 = q^2 \cdot \sin^2 b - \{p \cdot \sin\delta - q \cdot \sin(i+\Delta)\}^2 \quad (15)$$

Since $KI = RI \equiv r$, perpendiculars from K and I to the Z axis are 2:1 in length. Accordingly, $$q \cdot \cos a \cdot \sin\delta = 2p \cdot \cos\delta \cdot \sin a \quad (16)$$

Since $\Delta SJO$ is a right-triangle and $\angle JOS = b$, $$p = q \cdot \cos b \quad (17)$$

Namely, $$p/q = \cos b \quad (18)$$

Equations (14) and (15) can be put together as:

$$q^2\cos^2(i + \Delta) + p^2\cos^2\delta - 2p \cdot q \cdot \cos(i + \Delta)\cos\delta \cdot \cos a =$$
$$q^2 \cdot \sin^2 b - \{p \cdot \sin\delta - q \cdot \sin(i + \Delta)\}^2 \cdot$$
$$q^2 \cdot \{\cos^2(i + \Delta) - \sin^2 b + \sin^2(i + \Delta)\} + p^2 \cdot (\cos^2\delta + \sin^2\delta) = 2p \cdot q \cdot \{\cos(i + \Delta)\cos\delta \cdot \cos a + \sin\delta \cdot \sin(i + \Delta)\}$$
$$1 - \sin^2 b + \frac{p^2}{q^2} =$$
$$2\frac{p}{q}\{\cos(i + \Delta) \cdot \cos\delta \cdot \cos a + \sin\delta \cdot \sin(i + \Delta)\}$$

Obtained by substituting Equation (18) into the above equation is:

$$\cos^2 b + \cos^2 b = \quad (19)$$
$$2\cos b \cdot \{\cos(i + \Delta) \cdot \cos\delta \cdot \cos a + \sin\delta \cdot \sin(i + \Delta)\}\cos b =$$
$$\cos(i + \Delta) \cdot \cos\delta \cdot \cos a + \sin\delta \cdot \sin(i + \Delta)$$

Equation (13) means $$\sin\alpha = 2\frac{p}{q}\sin\delta - \sin(i + \Delta)$$

Obtained by substituting Equation (18) into the above equation is:

$$= 2\cos b \cdot \sin\delta - \sin(i + \Delta)$$

Obtained by substituting Equation (19) into the above equation is:

$$\sin\alpha = 2\cos a \cdot \sin\delta \cdot \cos\delta \cdot \cos(i + \Delta) + \quad (20)$$
$$2\sin^2\delta \cdot \sin(i + \Delta) - \sin(i + \Delta) =$$
$$\cos a \cdot \sin 2\delta \cdot \cos(i + \Delta) - \cos 2\delta \cdot \sin(i + \Delta)$$

Equation (16) means $$\sin\beta = \frac{2p \cdot \cos\delta \cdot \sin a}{q \cdot \cos a}$$

Obtained by substituting Equation (18) into the above equation is:

$$= \frac{2\cos b \cdot \cos\delta \cdot \sin a}{\cos a}$$

Obtained by substituting Equation (19) into the above equation is:

$$= \{2\cos(i + \Delta) \cdot \cos\delta \cdot \cos a \cdot \cos\delta \cdot \sin a + \quad (21)$$
$$2\sin\delta \cdot \sin(i + \Delta) \cdot \cos\delta \cdot \sin a\}/\cos a$$
$$= \{\sin 2a \cdot \cos^2\delta \cdot \cos(i + \Delta) +$$
$$\sin a \cdot \sin 2\delta \cdot \sin(i + \Delta)\}/\cos\delta$$

Since the relationship between $\alpha$ and $i+\Delta$ is defined from Equation (20), the value of $\Delta$ corresponding to a desirable value of $\alpha$ is obtained. The optical path of the incident beam SO is deviated by the obtained value of $\Delta$ by the AOD 8 or the mirror 80. Then, even if the polygon mirror 9 is rotated, no linebow is generated. Precisely, however, Equation (20) includes the unknowns of a, $\delta$, and i. This inconvenience is solved as follows:

The expression $\Delta y = y'' = y_0''$, which indicates the size of the curve of the trace line TL, is obtained in the following way.

As shown in Equation (11), $$x'' = f \cdot \cos a \cdot \sin\beta$$
$$y'' = f \cdot \sin a$$

When $y_0''$: the value of $y''$ when $a = \delta = \Delta = 0$ $$y_0'' = -f \cdot \sin i$$

Accordingly, the size of the curve of the trace line TL is:

$$y'' - y_0'' = f(\sin a + \sin i) \quad (22)$$

Figure 6:
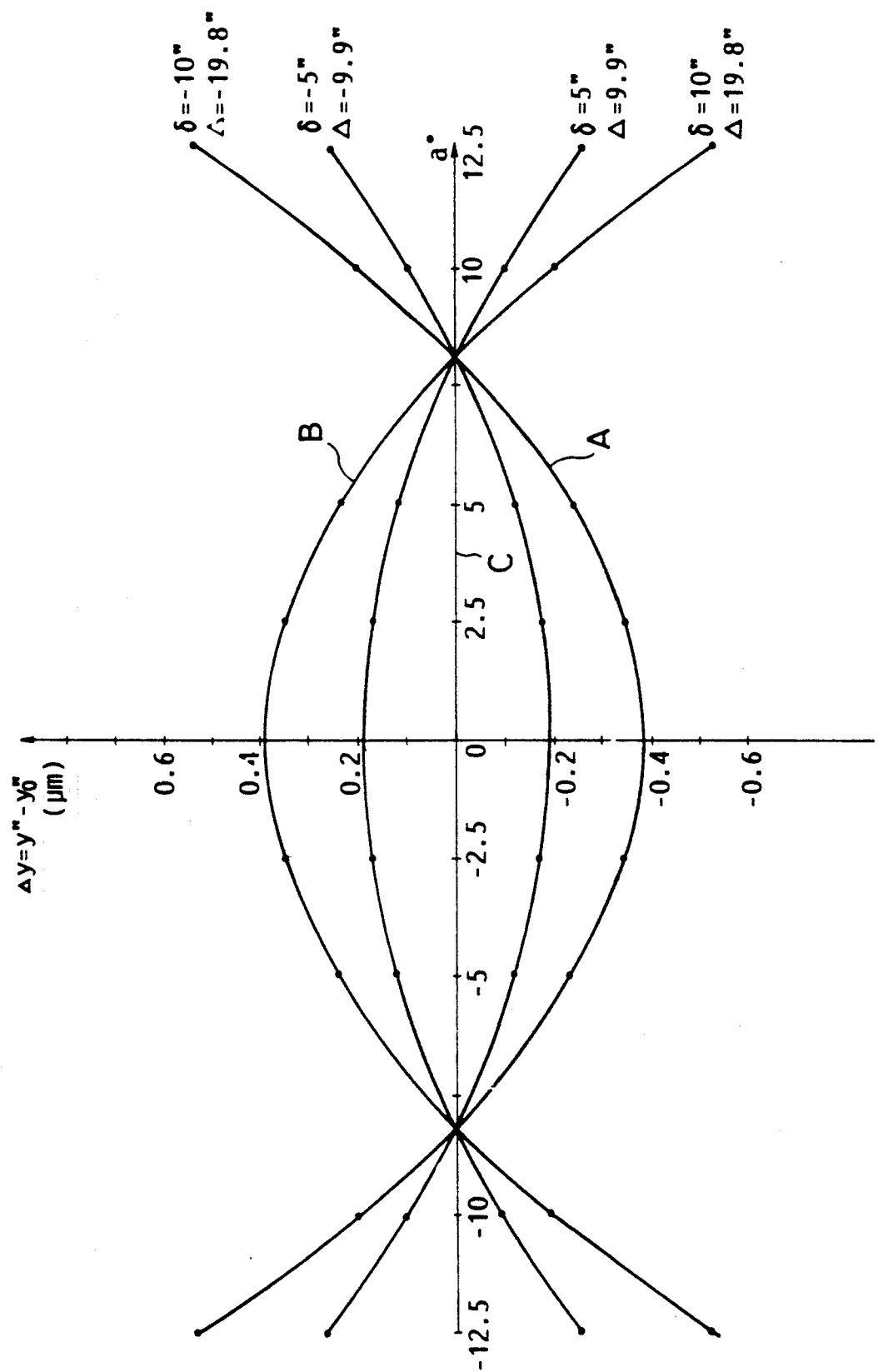
FIG. 6 is graph showing deviation amounts of a trace line under various conditions.

Then, the values of $\Delta y = y'' - y_0''$ under various conditions are obtained by setting the unknowns at various values as shown in Table 1 and FIG. 6. f=400 mm and i=−5°.

TABLE 1

| $a°$ | 0 | 2.5 | 5 | 7.5 | 10 | 12.5 | Condition |
|---|---|---|---|---|---|---|---|
| $y'' - y_0''$ (μm) | 0 | 0 | 0 | 0 | 0 | 0 | $\Delta = \delta = 0$ |
| " | 0.19 | 0.17 | 0.12 | 0.03 | −0.10 | −0.26 | $\delta = 5''$ |
|  |  |  |  |  |  |  | $\Delta = 9.9''$ |
| $y'' - y_0''$ (μm) | 0.39 | 0.35 | 0.24 | 0.06 | −0.20 | −0.53 | $\delta = 10''$ |
|  |  |  |  |  |  |  | $\Delta = 19.8''$ |
| $y'' - y_0''$ (μm) | −0.19 | −0.17 | −0.12 | −0.03 | 0.10 | 0.26 | $\delta = -5''$ |
|  |  |  |  |  |  |  | $\Delta = -9.9''$ |
| $y'' - y_0''$ (μm) | −0.39 | −0.35 | −0.24 | −0.06 | 0.20 | 0.53 | $\delta = -10''$ |

TABLE 1-continued

| $a^o$ | 0 | 2.5 | 5 | 7.5 | 10 | 12.5 | Condition |
|---|---|---|---|---|---|---|---|
| | | | | | | | $\Delta = -19.8''$ |

Although the value of $\Delta y = y'' - y_0''$ is not indicated when $a = -2.5°$ to $-12.5°$ in Table 1, it is apparent from FIG. that the absolute value of $y'' - y_0''$ is the same whether a is positive or negative.

The value of $\Delta$ which realizes $\Delta y = 0$ is used to control the AOD 8 or the mirror 80.

Also as apparent from FIG. 6, when the mirror surface of the polygon mirror 9 has a pyramidal error of, for example, $-10''$, the scanning line shown with (A) is obtained by fine-adjusting $\Delta$ by 19.8". Although $\Delta y = 0$ is not realized in this example, the scanning line (A) is deviated from the ideal scanning line (C) only by 0.5 μm at most, which involves no practical problem.

Accordingly, the curve of the trace line TL can be restricted enough to eliminate practical inconvenience only by finding the pyramidal error in the positive or negative direction of each mirror surface of the polygon mirror 9 with respect to the rotating axis thereof. There is no need of continuously fine-adjusting the angle of incidence of the beam.

PRACTICAL METHOD OF COMPENSATION

Figure 7:
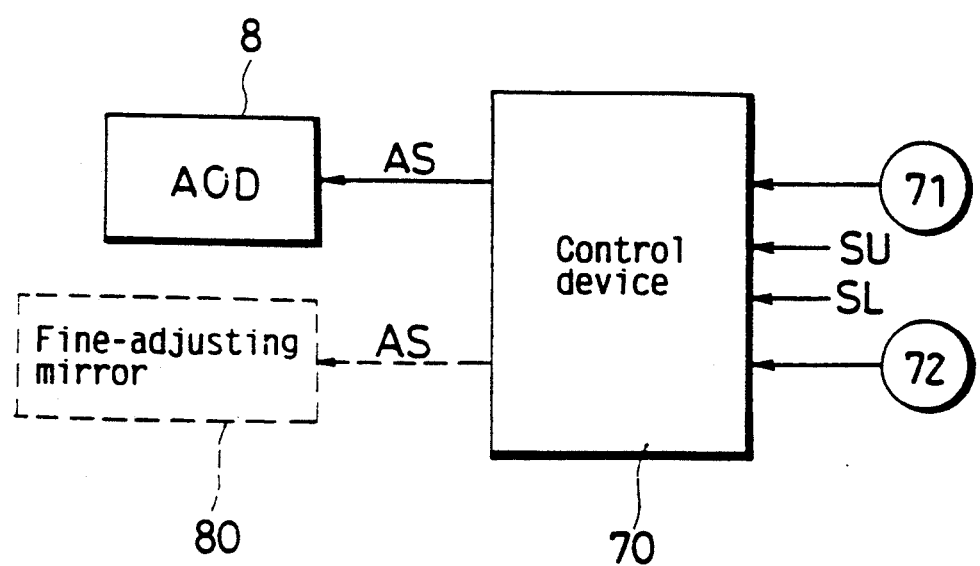
FIG. 7 is a block diagram of a control system.

FIG. 7 shows a control system for compensating for the pyramidal error by fine-adjusting the value of $\Delta$ by use of the AOD 8 or the mirror 80. A control device 70 stores pyramidal errors $\delta$ of the mirror surfaces of the polygon mirror 9 and the relationship between $\alpha$ and $i + \Delta$, which has been obtained in advance from Equation (20).

On receiving the detecting signals from the start sensor 71 and the origin pulse generator 72, the control device 70 judges which mirror surface is used for scanning according to the above-mentioned procedure. Then, the device 70 calculates the value of $\Delta$ which realizes $\Delta y = 0$ in accordance with the pyramidal error $\delta$ of the relevant mirror surface and the relationship between $\alpha$ and $i + \Delta$, and sends the angle adjusting signal AS corresponding to the calculating result to AOD 8 or the mirror 80. Then, a driving device, comprising piezoelectric elements, which is connected to the device 70, is controlled, whereby the angle of the incident beam is adjusted in such a direction that the pyramidal error is compensated for.

Table 2 shows the values of $\Delta y = y'' - y_0''$ when f = 400 mm, i = $-5°$ and $\Delta = 0$ (no compensation) for reference.

TABLE 2

| $a^o$ | 0 | 12.5 | 0 | 12.5 |
|---|---|---|---|---|
| $\delta$ (sec.) | 0 | 0 | 10 | 10 |
| $\Delta$ (sec.) | 0 | 0 | 0 | 0 |
| x'' (mm) | 0 | 168.4040 | 0 | 168.4033 |
| y'' (mm) | 34.8623 | 34.8623 | 34.9009 | 34.9000 |
| y'' − y_0'' (μm) | 0 | 0 | 38.6 | 37.7 |

When a polygon mirror having a pyramidal error $\delta$ of 10" is used and the light beam is incident on the polygon mirror 9 from right below the optical axis of the f·sin$\theta$ lens 10, the curve of the trace line TL is restricted up to 0.9 (= 38.6 − 37.7) μm but the beam pitch is deviated by approx. 38 μm. The deviation of the beam pitch can be lowered down to approx. 1 μm by adjusting the angle of the incident beam for each mirror surface. The compensating amount of each mirror surface may be stored in a memory device in advance and read out when scanning is done instead of being obtained through a real-time calculation.

Table 3 shows the values of $y'' - y_0''$ when f = 400 mm, i = $-5°$ and $\Delta = +19.763''$.

TABLE 3

| $a^o$ | 0 | 12.5 | 0 | 12.5 |
|---|---|---|---|---|
| $\delta$ (sec.) | 10 | 10 | −10 | −10 |
| $\Delta$ (sec.) | 19.763 | 19.763 | −19.763 | −19.763 |
| x'' (mm) | 0 | 168.4047 | 0 | 168.4034 |
| y'' (mm) | 34.8623 | 34.8618 | 34.8618 | 34.8628 |
| y'' − y_0'' (μm) | 0.5 | −0.5 | −0.5 | −0.5 |

This invention may also be applied to other types of rotatable polygon mirrors (for example, a cylindrical mirror with two opposed portion thereof being flat) and to an image reading apparatus.

Although the present invention has been fully described by way of an embodiment with references to the accompanying drawings, it is to be noted that various changes and modifications will be apparent to those skilled in the art. Therefore, unless such changes and modifications depart from the scope of the present invention, they should be construed as being included therein.

What is claimed is:

1. In an image scanning method for compensating for a pyramidal error of a rotating body having at least two reflective mirror surfaces by fine-adjusting an angle of a light beam incident on the rotating body, the improvement comprising:

putting a scanning lens having a scanning characteristic of f·sin$\theta$ on an optical path of the light beam reflected from the rotating body in such a manner that an optical axis of the scanning lens is substantially orthogonal to a rotating axis of the rotating body; and deflecting the angle made of the light beam incident on the rotating body by deflecting means within a plane including the rotating axis of the rotating body and the optical axis of the scanning lens for each reflective mirror surface based on an equation:

$$\sin\alpha = \cos a \cdot \sin 2\delta \cdot \cos(i+\Delta) - \cos 2\delta \cdot \sin(i+\Delta)$$

where $\alpha$: an angle made of the light beam reflected from the rotating body and a plane including the optical axis of the scanning lens and being orthogonal to the rotating axis of the rotating body, $\delta$: a pyramidal error of each reflective mirror surface of the rotating body, $i + \Delta$: an angle made of the light beam incident on the rotating body and the optical axis of the scanning lens, $\Delta$: an angle of the light beam deflected by the deflecting means, and a: an angle made of a normal line of each reflective mirror surface and the optical axis of the scanning lens when there is no pyramidal error.

2. An image scanning method of claim 1, wherein the rotating body is a polygon mirror and the deflecting means is an acoustic optical deflector.

3. An image scanning apparatus for compensating for a pyramidal error of a rotating body having at least two reflective mirror surfaces by fine-adjusting an angle of a light beam incident on the rotating body, the apparatus comprising:

a scanning lens having a scanning characteristic of f·sinθ provided in such a manner that an optical axis of said scanning lens is substantially orthogonal to a rotating axis of the rotating body;

deflecting means for deflecting the angle mode of the light beam and the optical axis of the scanning lens incident on the rotating body within a plane including the rotating axis of the rotating body and the optical axis of said scanning lens;

pyramidal error compensating amount outputting means for outputting a pyramidal error compensating amount of each reflective mirror surface of the rotating body based on a pyramidal error amount thereof which has been measured in advance; and control means for fine-adjusting the angle made of the light beam incident on one of the reflective mirror surfaces and the optical axis of the scanning lens by moving said deflecting means with respect to the above one reflective mirror surface based on the pyramidal error compensating amount of the above one reflective mirror surface.

4. An image scanning method of claim 3, wherein the rotating body is a polygon mirror and said deflecting means is an acoustic optical deflector.

5. An image scanning apparatus of claim 4, further comprising first detecting means for detecting an origin of the rotating axis of the polygon mirror and second detecting means for detecting a start of a main scanning for each reflective mirror surface, wherein said pyramidal error compensating amount outputting means defines one of the reflective mirror surfaces which is used for scanning based on the detecting results of said first and said second detecting means and outputs a pyramidal error compensating amount of the above one reflective mirror surface.

6. An image scanning apparatus of claim 5, wherein said pyramidal error compensating amount outputting means is memory means for storing data concerning the pyramidal error compensating amount corresponding to the above one reflective mirror surface.

7. In a method for preventing a linebow of a trace line in an image recording apparatus comprising:

a rotating body having at least two reflective mirror surfaces;

deflecting means for fine-adjusting an angle made of a light beam and the optical axis of the scanning lens incident on the rotating body;

a recording medium which the light beam reflected on one of the reflective mirror surfaces is illuminated on and has the trace line formed thereon; and a scanning lens provided on an optical path between the rotating body and the recording medium;

the improvement comprising:

employing, as a scanning, such a lens that a deviation amount of the reflected light beam caused by a pyramidal error of the rotating body is determined independently from a projecting angle of the reflected light beam on an ideal main scanning plane, the incident light beam being confined within a plane including a rotating axis of the rotating body and an optical axis of the scanning lens, and the angle being changed in accordance with a rotating amount of the rotating body; and fine-adjusting the angle made of the incident light beam and the optical axis of the scanning lens by the deflecting means based on an equation:

$$\sin\alpha = \cos a \cdot \sin 2\delta \cdot \cos(i+\Delta) - \cos 2\delta \cdot \sin(i+\Delta)$$

where

α: an angle made of the light beam reflected on the rotating body and a plane including the optical axis of the scanning lens and being orthogonal to the rotating axis of the rotating body, δ: a pyramidal error of each reflective mirror surface of the rotating body, i+Δ: an angle made of the light beam incident on the rotating body and the optical axis of the scanning lens, Δ: an angle of the light beam fine-adjusted by the deflecting means, and a: an angle made of a normal line of each reflective mirror surface and the optical axis of the scanning lens when there is no pyramidal error.

8. A method of claim 7, wherein the scanning lens is an f·sinθ lens.

9. An image recording apparatus comprising:

a rotating body having at least two reflective mirror surfaces;

light beam outputting means for making a light beam incident on said rotating body;

a recording medium on which the light beam reflected on said rotating body is illuminated;

a scanning lens having a scanning characteristic of f·sinθ and provided on an optical path between said rotating body and said recording medium, an optical axis of said scanning lens being substantially orthogonal to the rotating axis of said rotating body;

pyramidal error compensating amount outputting means for outputting a pyramidal error compensating amount of each reflective mirror surface based on a pyramidal error thereof which has been detected in advance; and control means for fine-adjusting an angle of the light beam incident on one of the reflective mirror surfaces and the optical axis of the scanning lens by moving the light beam outputting means with respect to the above one reflective mirror surface based on the pyramidal error compensating amount of the above one reflective mirror surface;

wherein:

said light beam outputting means is provided in such an optical relationship that makes the light beam incident on said rotating body within a plane including the rotating axis of said rotating body and the optical axis of said scanning lens;

said control means fine-adjusts the angle of the incident light beam in the above plane; and the pyramidal error compensating amount is obtained based on an equation:

$$\sin\alpha = \cos a \cdot \sin 2\delta \cdot \cos(i+\Delta) - \cos 2\delta \cdot \sin(i+\Delta)$$

where

α: an angle made of the light beam reflected on said rotating body and a plane including the optical axis of said scanning lens and being orthogonal to the rotating axis of said rotating body, δ: a pyramidal error of each reflective mirror surface of said rotating body, and i+Δ: an angle made of the light beam incident on said rotating body and the optical axis of said scanning lens, Δ: an angle of the light beam fine-adjusted by said control means, and a: an angle made of a normal line of each reflective mirror surface and the optical axis of said scanning lens when there is no pyramidal error.

10. An image recording apparatus of claim 9, wherein said rotating body is a polygon mirror and said control means is an acoustic optical deflector.

11. An image recording apparatus of claim 10, further comprising first detecting means for detecting an origin of the rotating axis of the polygon mirror and second detecting means for detecting a start of a main scanning for each reflective mirror surface, wherein said pyramidal error compensating amount outputting means defines one of the reflective mirror surfaces which is used for scanning based on the detecting results of said first and said second detecting means and outputs a pyramidal error compensating amount of the above one reflective mirror surface.

* * * * *

UNITED STATES PATENT AND TRADEMARK OFFICE
CERTIFICATE OF CORRECTION

PATENT NO. : 5,235,438
DATED : August 10, 1993
INVENTOR(S) : Shigeru Sasada

It is certified that error appears in the above-identified patent and that said Letters Patent is hereby corrected as shown below:

<u>Title page, 15th line of ABSTRACT</u>, "wherein" should read --where--;

<u>Column 1, line 68</u>, "4 axis" should read --Y axis--;

<u>Column 2, line 65</u>, "an" should read --$\alpha$: an--;

<u>Column 3, line 1</u>, "$\alpha$:" should read --$\delta$:--;

<u>Column 5, line 45</u>, "are" should read --is--;

<u>Column 6, line 60</u>, "of 20" should read --of--;

<u>Column 7, line 4</u>, "(CZ)" should read --(OZ)--;

<u>Column 7, line 18</u>, "{ABCD" should read --□ABCD--;

<u>Column 7, bridging lines 19-20</u>, "∠CAD=$\phi$-C'A'D'=$\gamma$." should read --∠CAD=∠C'A'D'=$\gamma$.--;

<u>Column 7, line 58</u>, "$\Delta$are" should read --$\Delta$y are--;

Column 7, line 16, "△" should read --□--.

<u>Column 8, line 15</u>, "$\cos\left(\tan^{-1}\dfrac{\tan\alpha}{\sin\beta}\right)$" should read --$\sin\left(\tan^{-1}\dfrac{\tan\alpha}{\sin\beta}\right)$--.

UNITED STATES PATENT AND TRADEMARK OFFICE
CERTIFICATE OF CORRECTION

PATENT NO. : 5,235,438

DATED : August 10, 1993

INVENTOR(S) : Shigeru Sasada

It is certified that error appears in the above-identified patent and that said Letters Patent is hereby corrected as shown below:

Column 8, line 34, "includes" should read --include--;

Column 9, line 14, that portion of Equation (16) reading "sin$\delta$" should read --sin$\beta$--;

Column 9, line 18, "p32 q.cos b" should read --p=q.cos b--;

Column 11, line 8, "FIG." should read --FIG. 6--;

Column 12, line 49, "body" should read --body and the optical axis of the scanning lens--;

Column 13, line 16, "angle mode" should read --angle made--;

Column 13, lines 17-18, "and the optical axis of the scanning lens incident on the rotating body" should read --incident on the rotating body and the optical axis of the scanning lens--;

Column 13, lines 57-58, "and the optical axis of the scanning lens incident on the rotating body" should read --incident on the rotating body and the optical axis of the scanning lens--;

UNITED STATES PATENT AND TRADEMARK OFFICE
CERTIFICATE OF CORRECTION

PATENT NO. : 5,235,438
DATED : August 10, 1993
INVENTOR(S) : Shigeru Sasada

It is certified that error appears in the above-indentified patent and that said Letters Patent is hereby corrected as shown below:

Column 14, line 48, "angle" should read --angle made--.

Signed and Sealed this

Fourth Day of July, 1995

Attest:

BRUCE LEHMAN

Attesting Officer     Commissioner of Patents and Trademarks